United States Patent [19]

Wang

[11] Patent Number: 5,322,482
[45] Date of Patent: Jun. 21, 1994

[54] BICYCLE CHAIN PLATE

[75] Inventor: Wen-Bin Wang, Tainon Hsien, Taiwan

[73] Assignee: Nah Bang Industrial Co., Ltd., Tainan Hsien, Taiwan

[21] Appl. No.: 52,707

[22] Filed: Apr. 27, 1993

[51] Int. Cl.⁵ .................................. F16G 1/24
[52] U.S. Cl. ....................................... 474/206
[58] Field of Search ............... 474/206, 209, 210, 212, 474/213, 226, 228-235

[56] References Cited

U.S. PATENT DOCUMENTS

| 4,102,216 | 9/1978 | Nagano | 474/231 |
| 5,151,066 | 9/1992 | Wu | 474/206 |
| 5,203,745 | 4/1993 | Wang | 474/206 |

Primary Examiner—Thuy M. Bui
Attorney, Agent, or Firm—Bacon & Thomas

[57] ABSTRACT

Bicycle chain plate includes an inner plate having a pair of protruding portions at respective ends of on one side thereof adopted to be inserted into two holes of an outer plate, respectively. The outer plate has also a pair of prtoruding portions at respective ends of one side thereof adopted also to be inserted into two holes of the inner plate so that the inner and outer plates are securely fastened.

3 Claims, 8 Drawing Sheets

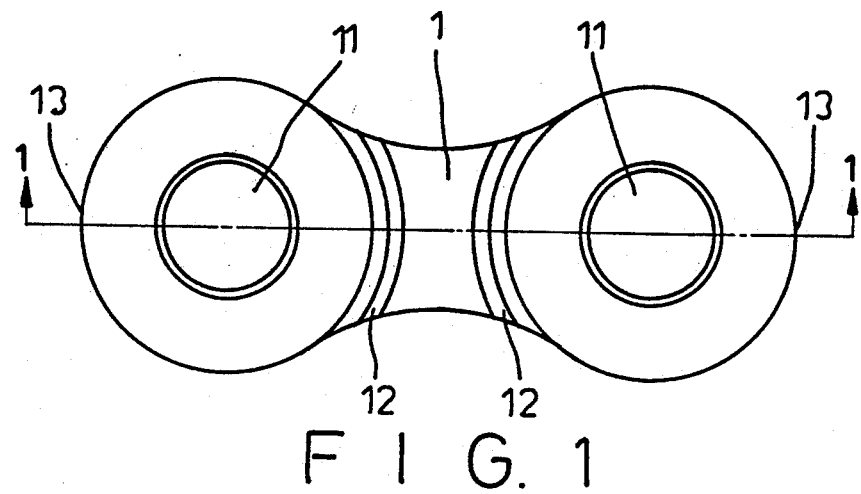
F I G. 1
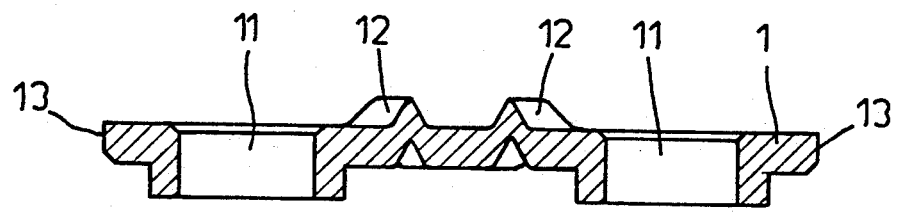
1-1
F I G. 1A
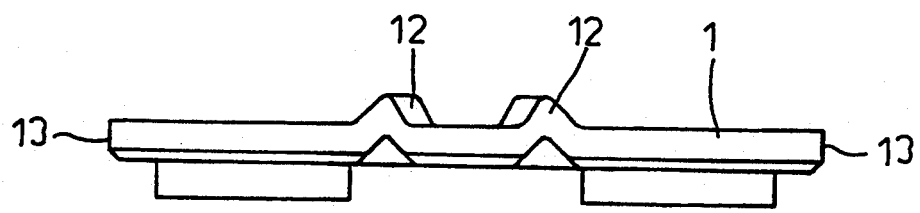
F I G. 1B

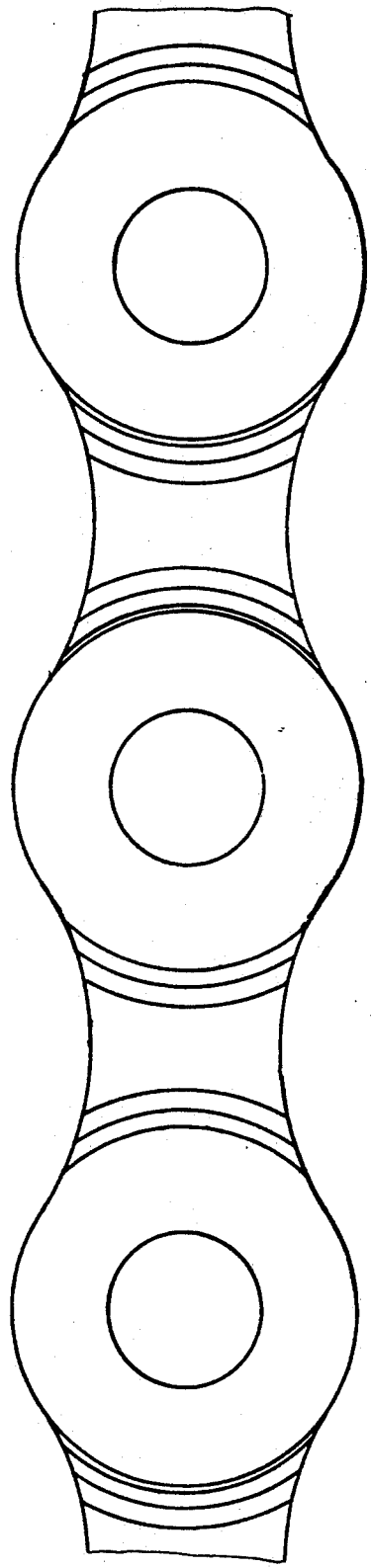
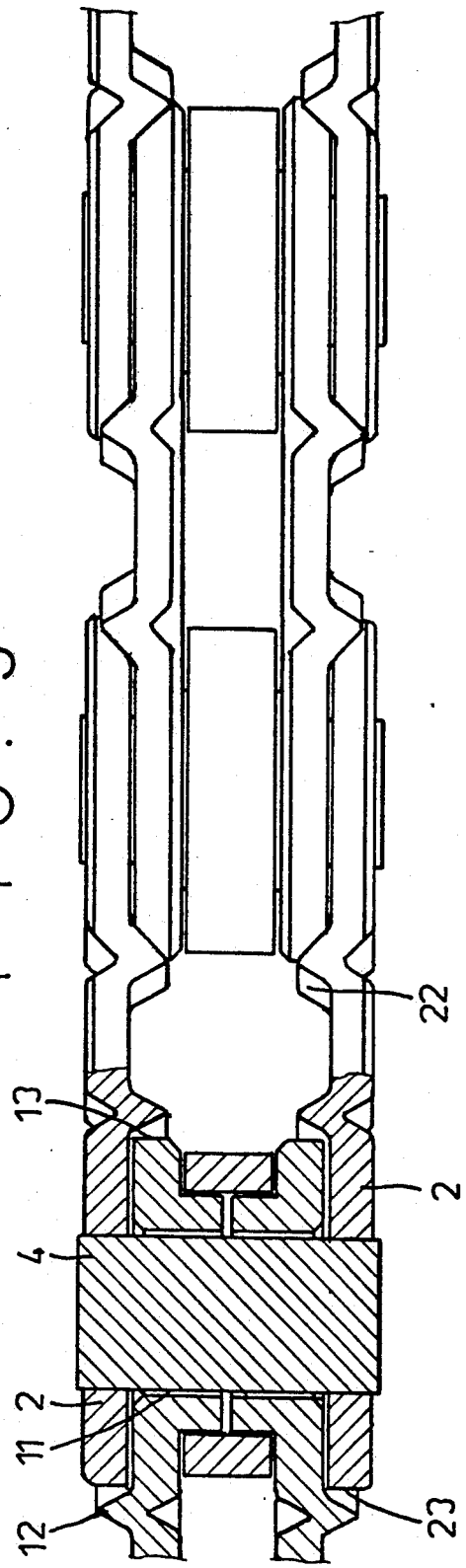
FIG. 3
FIG. 3A

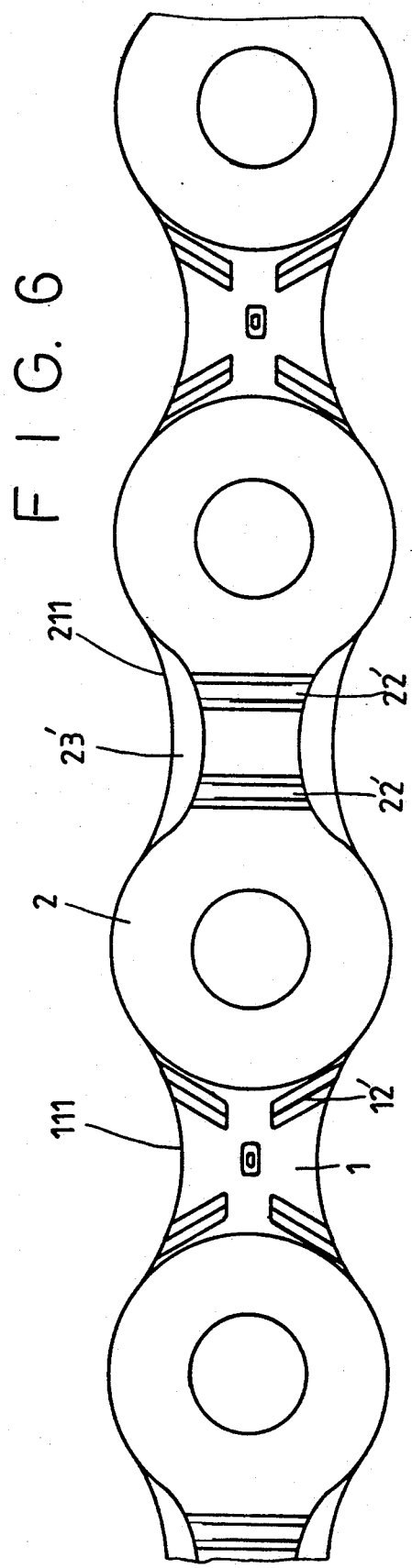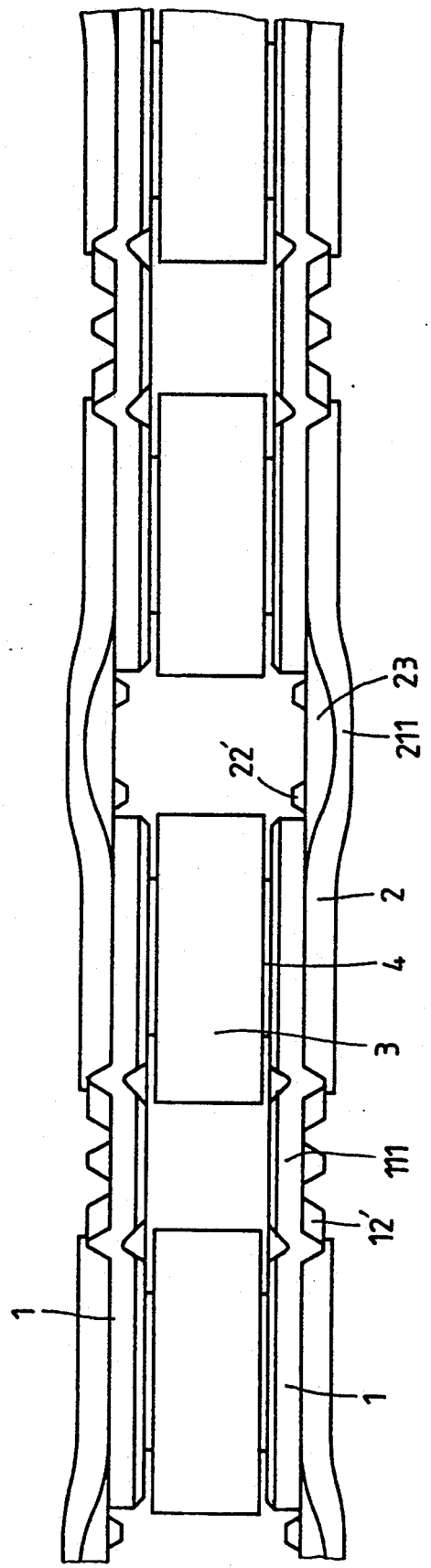

BICYCLE CHAIN PLATE

FIELD OF THE INVENTION

This invention relates to a bicycle chain plate. More particularly, a bicycle chain includes an inner plate and an outer plate, each plate having a pair of protruding portions to be inserted into respective holes of the other for securing purpose.

BACKGROUND OF THE INVENTION

Bicycle chain is an essential equipment to drive the bicycle forwardly, or backwardly. This chain, as shown in FIG. 8 is composed of an inner plate A securely connected to an outer plate by means of stators C and pins D. However, the chains of prior art may be loosen from engagement with a sprocket E and the sprocket E also may be stuck in between the inner and outer chain plates A, B.

The inventor, in view of this, has invented the present invention which made improvement on the above-mentioned shortcomings.

SUMMARY OF THE INVENTION

It is the primary object of the present invention to provide a bicycle chain prevents chain from stucking in between two sprockets when switching gears.

It is another object of the present invention to provide a bicycle chain which prevents chain from sticking into an inner and an outer chain plate.

It is a further object of the present invention to provide a bicycle chain which prevent noise caused by switching gears.

BRIEF DESCRIPTION OF THE PREFERRED EMBODIMENT

FIG. 1 is a top view of an inner chain plate of the present invention;

FIG. 1A is a cross sectional view, taken along line A-A of FIG. 1;

FIG. 1B is a front elevational view of FIG. 1;

FIG. 3 is a top view of the present invention showing the inner and the outer chain plate being securely fastened;

FIG. 3A is a front view of FIG. 3, partially sectioned;

Figure 4:
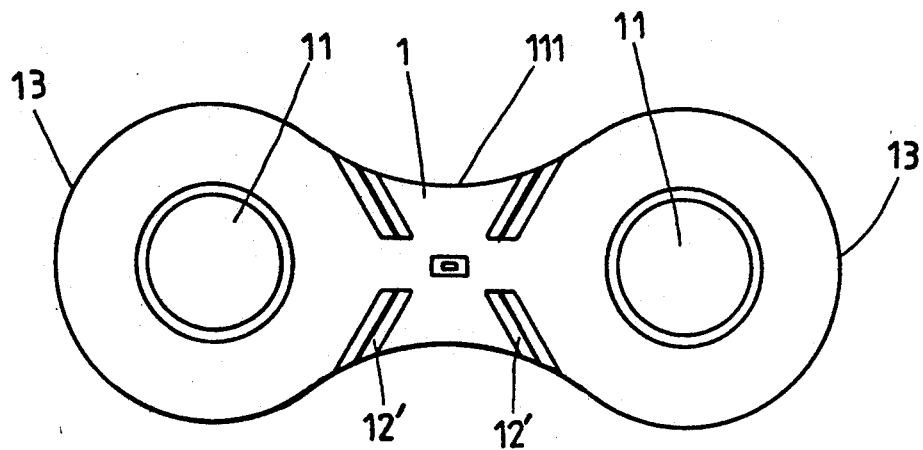
Figure 4A:
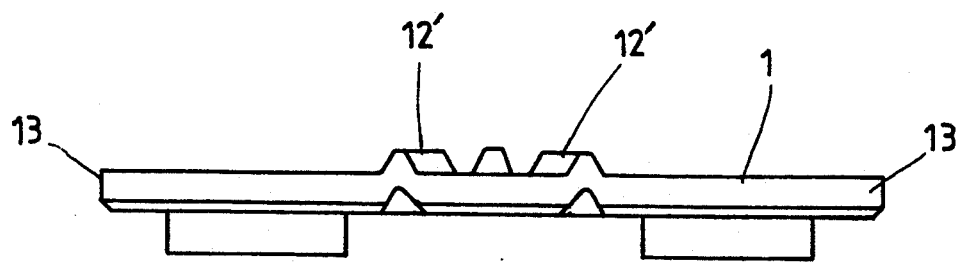
Figure 5:
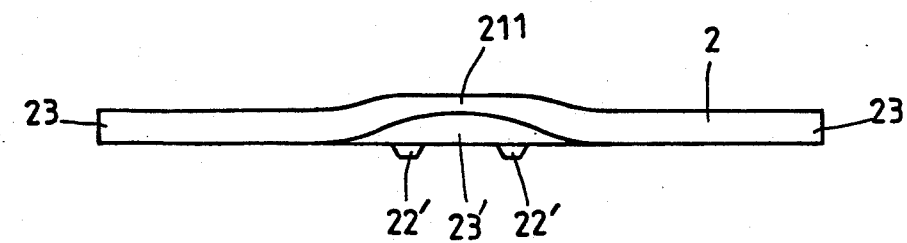
Figures 5A, 5B:
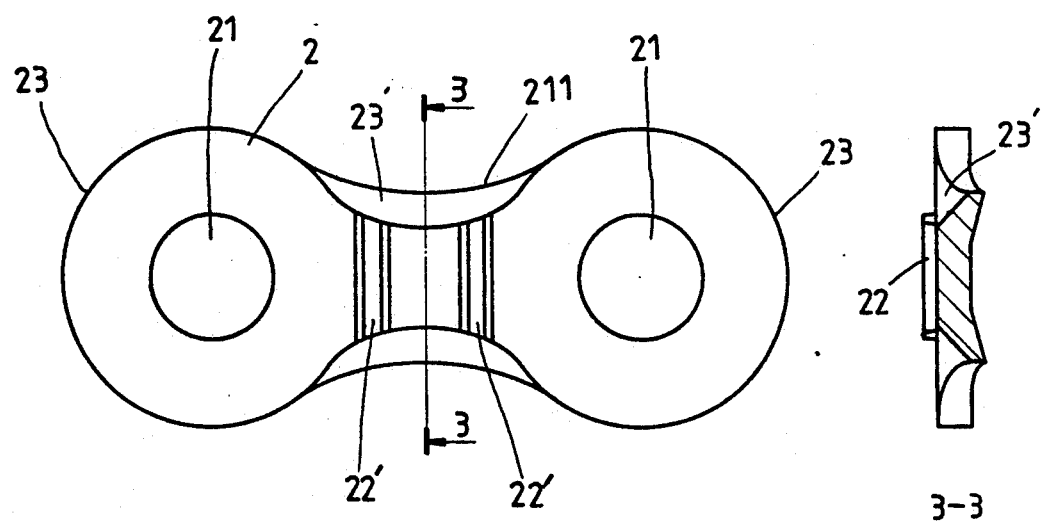
Figure 7B:
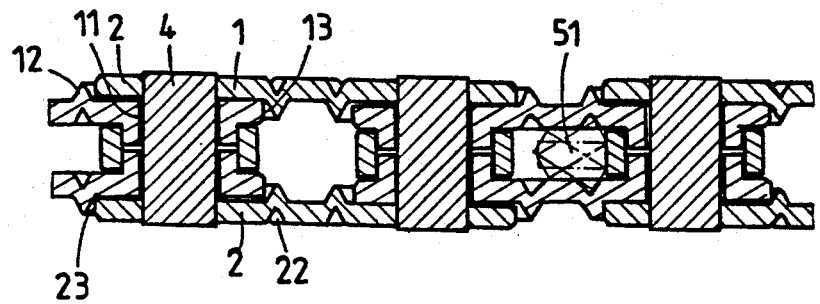
Figure 7:
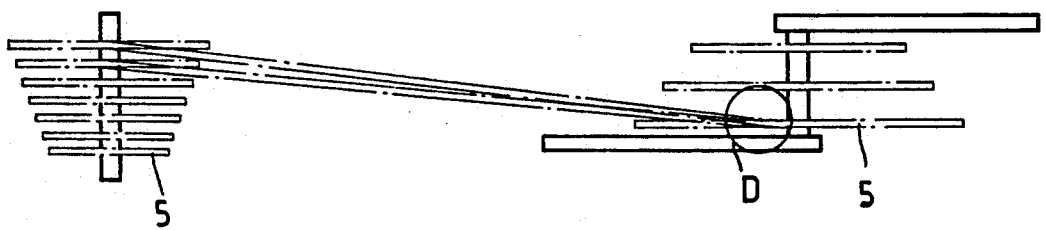
Figure 7A:
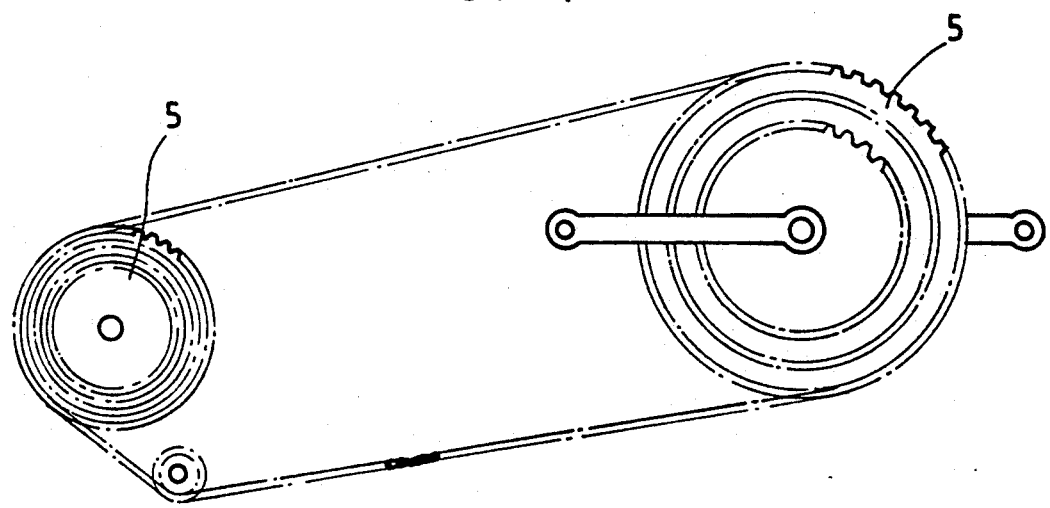

FIG. 4 a top view of an inner chain plate of another embodiment;

FIG. 4A is a side elevational view of FIG. 4;

FIG. 5 is a front view of an outer chain plate of the second embodiment;

FIG. 5A is a top view of FIG. 5;

FIG. 5B is a side cross sectional view taken along line C-C, FIG. 5A;

FIG. 6 is a top view of a chain assembled by the inner and the outer chain plates of the second embodiment;

FIG. 6A is a side view of FIG. 6;

FIG. 7 is a top view of wheels and chain of a bicycle;

FIG. 7A is a side view of FIG. 7;

FIG. 7B is an enlarged view taken along circle D, FIG. 7; and

Figure 8:
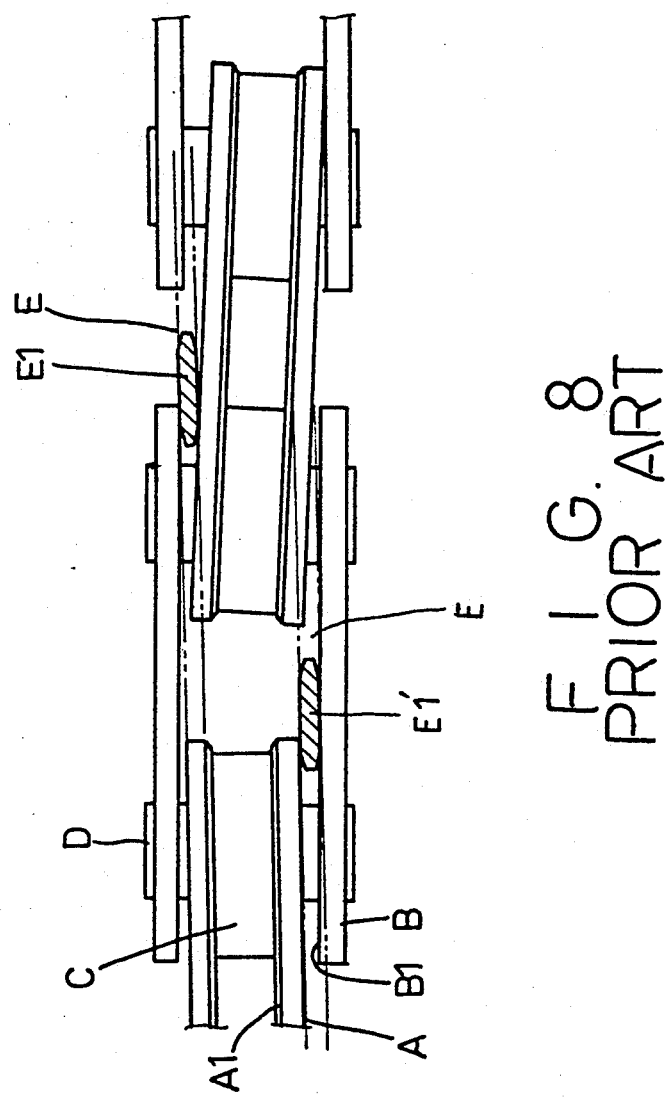

FIG 8 is a prior art.

DETAILED DESCRIPTION OF THE DRAWINGS

Referring is now made to the drawings wherein the showings are for the purpose of illustrating a preferred embodiment of the invention only and not for the purpose of limiting the same, FIG. 1 shows an inner chain plate 1 having two holes 11 at respective ends, two protruding portions 12 at two sides close to the center portion of the plate 1 in an arcuate shape, and are concentric with the holes 11, as shown in FIGS. 1A, 1B. Two arcuate peripheries 13 are formed at respective ends. The protruding side of the inner chain plate 1 is defined as outer end.

Figure 2:
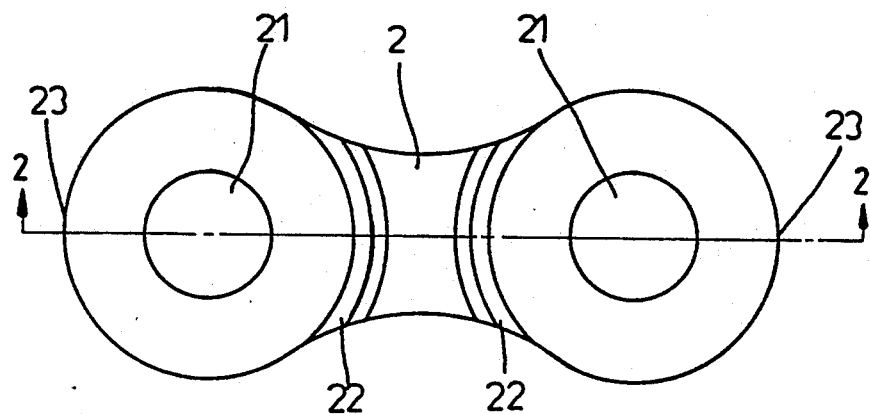
FIG. 2 is a top view of an outer chain plate of the present invention.
Figure 2A:
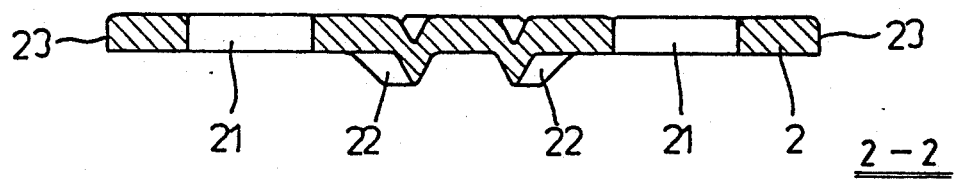
FIG. 2A is a cross sectional view, taken along line B-B of FIG. 2.
Figure 2B:
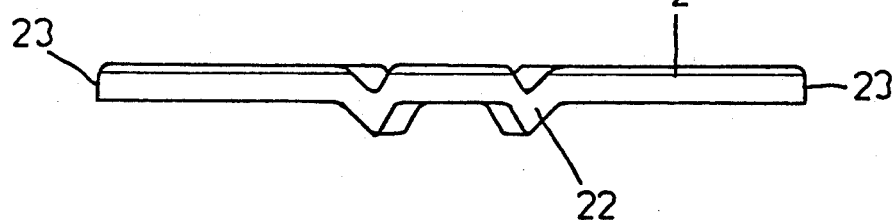
FIG. 2B is a front elevational view of FIG. 2.

FIG. 2 shows an outer chain plate 2 having also two holes 21 at respective ends, two protruding portions 22 at two sides close to the center portion of the plate 2 in a arcuate shape and are concentric with the holes 21, as shown in FIGS. 2A and 2B. Two arcuate peripheries 23 are formed at respective ends thereof. The protruding side of the outer chain plate 2 is defined as inner end.

To assemble the present invention, place an inner chain plate 1 on an outer chain plate 2 with the outer end of the inner chain plate 1 facing inwardly and the inner end of the outer chain plate 2 facing inwardly. This allows the protruding portion 12 at one end against the perphery 23 of the outer plate 2, while the outer end of the protruding portion 12 of the inner plate 1 is against the periphery 23 of the other out chain plate 2, so that every hole 11 of the inner plate 1 overlaps with a hole 21 of an outer plate 2. By repeating these steps, a chain is formed thereafter. Line up two chains in parallel and insert a rotor 3 in between holes of the two chains and secured with a pin 4, as shown in FIGS. 3 and 3A.

Another embodiment of the present invention is shown in FIGS. 4, 4a, 5, 5A, 5B and 5C. The arcuate shaped protruding portions 12 of the inner plate 1 are replaced with strips 12' in a slanting manner toward the center portion. The arcuate shaped protruding portions 21 of the outer plate 2 are also replaced with two strips 22' the inner end. Two cut off portions 23' are formed at respective sides of the inner end of the outer plate 2 as guide to lead sprockets fall into correct position, as shown in FIGS. 6, 6A.

When the present invention is utilized with multiple wheels, as shown in FIGS. 7, 7A, the protruding portions 12, 22 shall prevent sprockets 5 from meshing in between the inner and outer chain plates 1, 2. Furthermore, the cut off portions 23' of the outer chain plate 2 will lead sprocket 5 to slide into the holes 11, 21.

I claim:

1. A bicycle chain plate comprising inner chain plates, outer chain plates, rollers and pins, and is characterized in that
    each of said inner plates having two arcuate shaped protruding portions at respective ends close to ,two holes adopted to be in touch with and against the periphery of said outer chain plate;
    each of said outer plates having also two arcuate-shaped portruding portions at respective ends close to two holes adopted to be in touch with and against the periphery of said inner chain plate.

2. A bicycle chain plate of claim 1, wherein said arcuate-shaped protruding portions are concentric with said holes.

3. A bicycle chain plate comprising inner chain plates, outer chain plates, rollers and pins wherein each of said inner chain plates having at least four strips slanting towards center portion of said inner chain plate, and each of said outer chain plates having at least two strips closing to center portion and to cut off portions at respective ends of said outer plate.

* * * * *